Patented Nov. 8, 1927.

1,648,434

UNITED STATES PATENT OFFICE.

HENRY C. WILLIAMS, OF SARGENT, NEBRASKA.

FUEL COMPOSITION.

No Drawing.   Application filed March 8, 1927. Serial No. 173,787.

My invention relates to fuel compositions having a two-fold alternative or combined function of serving either as a fuel itself or as a fire starter. The object of my invention is the provision of a compact fuel composition of high degree of absorption, the ingredients being selected and proportioned for providing a source of intense heat in a comparatively small bulk and weight of the mixture. A second object of my invention is the utilization of waste products for producing a fuel mixture, the separate ingredients individually having very little commercial value. Still another of my objects is the provision of a fuel mixture having carbon eliminating properties.

While the ingredients of the mixture and the proportions of the ingredients may be varied within rather wide limits, I have found that a mixture having substantially the following formula produces satisfactory results:

|  | Per cent. |
| --- | --- |
| Sawdust | 30 |
| Cow chips | 30 |
| Ground corn cobs | 30 |
| Salt | 10 | the proportions being by volume. To this mixture may be added just sufficient petroleum or the like to start the combustion of the mixture when the match is applied.

The sawdust is a waste product having considerable density. Taken alone the sawdust is rather poor fuel because of this density but in the mixture as above described it furnishes the necessary body and it gives off an intense heat. The sawdust may be either hard or soft wood and my object is to use the most readily available sawdust which I can obtain. The cow chips should be weathered so that the action of the sun, rain and wind will leave them practically devoid of nitrogenous compounds. It will then consist of vegetable and waste animal material which has been subjected to fungous growths which hold the fire in much the same way as is the case with punk and joss sticks. The cow chips after weathering are more or less friable and they should be reduced by grinding before placing them into the mixture. The corn cobs are also ground and these also are of light weight. Corn cobs alone will produce an intense heat but because of their light weight the heat is of short duration. In the mixture they are especially serviceable as an absorbent for the petroleum. The cow chips thus retain the spark which would be apt to be extinguished in the sawdust alone but the sawdust under the action of the spark from the cow chips will hold the fire for a much longer time than either the cow chips or the corn cobs alone could hold it. While the cow chips and corn cobs are both composed of very light material, their functions are radically different. The corn cobs produce a much more intense heat than can be obtained from the cow chips but the cow chips, and especially the fungous portion, hold the fire for a much longer period than the corn cobs could.

Cow chips are used in the mixture very largely because they are more plentiful than any other substance which could perform their function. In general, however, any animal chips which have been thoroughly weathered will answer the purpose and I therefore desire it to be distinctly understood that the formula may be varied by the substitution of other animal chips for cow chips in the formula.

The salt is placed in the mixture for the purpose of reducing the carbon in the smoke produced by the combustion of the other ingredients of the mixture. I have tried this out in the kitchen range as well as in open fires and I find that the presence of the salt results in a much lighter colored smoke and that it tends to eliminate soot in stove pipes. The primary purpose of the petroleum in the mixture is to make it easy to start combustion in the mixture but it also has the effect of compacting the mass so that it is much easier to handle than if it were dry. For this purpose distillate or kerosene function very satisfactorily and they are low in price. Any other suitable inflammable liquid which is readily absorbed into the mixture may, however, be used in the place of the kerosene or distillate.

In use as a fire starter, a small piece of paper is placed in the grate of the stove with a small amount of the mixture on the paper. The fuel is then laid in the usual way except that no kindling of the usual kinds is required. The match is then applied at the edge of the paper and this will start combustion of the mass of material on the paper at its edges. The heat is quite intense and by the time the mixture has been consumed the fuel in the stove will have been started.

As a fuel for campers and tourists, the mixture which I have described is ideal because of the intense heat resulting from small amounts of the fuel. It may be carried on the trip in small bags and used as desired but when used on camping trips it is preferable to have it in the form of briquettes. These may be produced by adding to the mixture a binder and then compressing them into briquettes of the desired size and form. The binder should preferably have combustible qualities and it must of course hold the mass of material together during transportation. Rosin or in fact any of the gummy vegetable exudations which are combustible, as, for example, balsam are ideal for this purpose.

Aside from the convenience of the fuel composition in a convenient form and having great heat generating qualities in comparison with the bulk and weight, the composition is very important in eliminating the many dangers incident to the starting of fires in the usual way. Fires are frequently laid even by very careful people and when combustion does not start properly, a few drops of kerosene are often applied for the purpose of making the kindling burn more briskly. The kerosene is usually stored in gallon cans and is ordinarily safe but it frequently has an accumulation of an explosive gas mixture above the kerosene. Many disastrous explosions and conflagrations are caused in this way resulting in deaths and great loss of property. With my fuel mixture this danger is entirely eliminated.

Having thus described my invention in such full, clear, and exact terms that its composition and utility will be readily understood by others skilled in the art to which it pertains, what I claim as new and desire to secure by Letters Patent of the United States is:

1. A fuel mixture containing substantially equal parts of saw dust, ground corn cobs, and weathered animal chips, and including also a relatively small amount of salt.

2. A fuel mixture having substantially the following formula: saw dust, 30%; dried animal chips, 30%; ground corn cobs, 30%; and salt, 10%, the mixture being moistened with a petroleum derivative.

In testimony whereof I affix my signature.

HENRY C. WILLIAMS.